United States Patent
Murata et al.

(10) Patent No.: US 6,541,890 B2
(45) Date of Patent: Apr. 1, 2003

(54) BRUSH-LESS ROTARY ELECTRIC MACHINE HAVING STATOR COOLING ARRANGEMENT

(75) Inventors: Nakato Murata, Nagoya (JP); Yoshiki Tan, Anjo (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/912,301

(22) Filed: Jul. 26, 2001

(65) Prior Publication Data

US 2002/0014807 A1 Feb. 7, 2002

(30) Foreign Application Priority Data

Jul. 26, 2000 (JP) .......................... 2000-225335

(51) Int. Cl.$^7$ .............................. H02K 1/22; H02K 9/06
(52) U.S. Cl. .......................... 310/263; 310/58; 310/62
(58) Field of Search ................................ 310/261, 263, 310/254, 208, 201, 42, 58–60 A

(56) References Cited

U.S. PATENT DOCUMENTS

| | | | | |
|---|---|---|---|---|
| 3,969,643 A | * | 7/1976 | Sapper .......................... | 310/53 |
| 4,972,114 A | * | 11/1990 | Frister ........................... | 310/263 |
| 5,177,385 A | * | 1/1993 | Hammer et al. ............... | 310/59 |
| 5,270,605 A | * | 12/1993 | Lefrancois et al. .......... | 310/263 |
| 5,543,676 A | | 8/1996 | York et al. ................... | 310/263 |
| 5,708,318 A | * | 1/1998 | Fudono ........................ | 310/263 |
| 5,828,155 A | | 10/1998 | Adachi et al. ............... | 310/263 |
| 5,965,965 A | | 10/1999 | Umeda et al. ................ | 310/52 |
| 5,998,903 A | | 12/1999 | Umeda et al. ............... | 310/179 |
| 6,114,793 A | * | 9/2000 | Asao et al. .................. | 310/263 |
| 6,291,921 B1 | * | 9/2001 | Asao .......................... | 310/263 |

FOREIGN PATENT DOCUMENTS

| | | |
|---|---|---|
| JP | 04304144 | 10/1992 |
| JP | 05199707 | 8/1993 |
| JP | 11098788 | 4/1999 |
| JP | 2000069729 | 3/2000 |

* cited by examiner

*Primary Examiner*—Tran Nguyen
(74) *Attorney, Agent, or Firm*—Oliff & Berridge, PLC

(57) ABSTRACT

A brush-less rotary electric machine is comprised of a frame having a first and second walls, a stator core fixed to the frame, an armature coil formed of conductor segments, a stationary yoke, a rotary yoke disposed opposite the stationary yoke, first claw pole members disposed opposite the stator core, second claw pole members disposed opposite the stationary yoke, and a field coil fixed to the stationary yoke. The armature coil has radial air passages formed among connection portions of the conductor segments, and the second claw pole members have a fan-shaped projection portion. When the claw pole members rotate, the projection portion supplies cooling air to the radial air passages to cool the second coil end.

6 Claims, 3 Drawing Sheets

BRUSH-LESS ROTARY ELECTRIC MACHINE HAVING STATOR COOLING ARRANGEMENT

CROSS REFERENCE TO RELATED APPLICATION

The present application is based on and claims priority from Japanese Patent Application 2000-225335 filed Jul. 26, 2000, the contents of which are incorporated herein by reference.

BACKGROUND OF THE INVENTION

1. Field of the Invention

The present invention relates to a brush-less rotary electric machine for a vehicle such as a passenger car or a truck.

2. Description of the Related Art

Usually, a vehicle AC generator has a field coil mounted on the rotor thereof. Accordingly, such an AC generator has a pair of slip rings, a pair of brushes and the brush holder thereof. Due to recent increase in the output power, increase in abrasion rate of the slip rings and the brushes and increase in heat generation by such a rotary power supply unit have become obstacles to providing a more powerful vehicle AC generator.

Although a brush-less AC generator that has a stationary field coil is well known, the stationary field coil is subject to muddy water, dust or the like, thereby causing gradual failure of insulation members of the field coil such as breakdown or short-circuiting of the field coil. Such a brush-less AC generator can not provide a sufficient amount of air for cooling the armature coil thereof because it is almost impossible to provide the rotor core with a pair of cooling fans due to the specific structure. In addition, a pole support ring, a large number of turns of field coil, etc. cause a high draft resistance of the cooling air passages inside the brush-less AC generator.

SUMMARY OF THE INVENTION

Therefore, the main object of the invention is to provide a reliable and powerful brush-less rotary electric machine that can provide a sufficient cooling air for the armature coil thereof.

According to a main aspect of the invention, a brush-less rotary electric machine includes a frame having a first and second walls and a pair of bearings fixed to the first and second walls, a stator core fixed to the frame, an armature coil formed of a plurality of U-shaped conductor segments having turn portions forming a first coil end and connection ends connected to one another to form a second coil end, a rotor shaft, a generally cylindrical stationary yoke, a rotary yoke disposed opposite the stationary yoke and fixed to the rotor shaft, a plurality of first claw pole members disposed opposite the inner periphery of the stator core, a plurality of second claw pole members fixed to the first claw pole members by a non-magnetic support member and disposed opposite the outer periphery of the stationary yoke, and a field coil fixed to the stationary yoke around the rotary yoke. The armature coil has a plurality of radial air passages at the second coil end, and the plurality of second claw pole members has a projection portion disposed close to the second wall.

Accordingly, the draft resistance of cooling passages in the coil end is reduced, and a plurality of upright side walls is formed at the plurality of second claw pole members. As a result, the armature coil can be cooled sufficiently, and muddy water and dust can be effectively discharged from the inside of the rotary electric machine.

According to another feature of the invention the connection ends are disposed opposite the plurality of second claw pole members. Therefore, the armature coil can be cooled more effectively.

According to another feature of the invention, each of the second claw pole members has a tapered projection portion disposed opposite the second coil end. This feature reduces the centrifugal force applied to the second claw pole members when the second claw pole members rotate.

According to another feature of the invention, the plurality of second claw pole members is supported at the projection portion by an annular magnetic member. This feature not only reinforces the second claw pole members against the centrifugal force during the rotation but reduces magnetic resistance of the air gap between the claw pole members and the stationary yoke.

According to another feature of the invention, the stationary yoke is fixed to the second wall. Therefore, a portion of the bearing can be utilized as a portion of the magnetic path, thereby providing a compact magnetic path.

According to another feature of the invention, the stationary yoke is disposed to abut the bearing fixed to the second wall. Therefore an additional retaining member for the bearing can be omitted.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A brush-less vehicle AC generator according to a preferred embodiment of the invention is described with reference to the appended drawings.

Figure 1A:
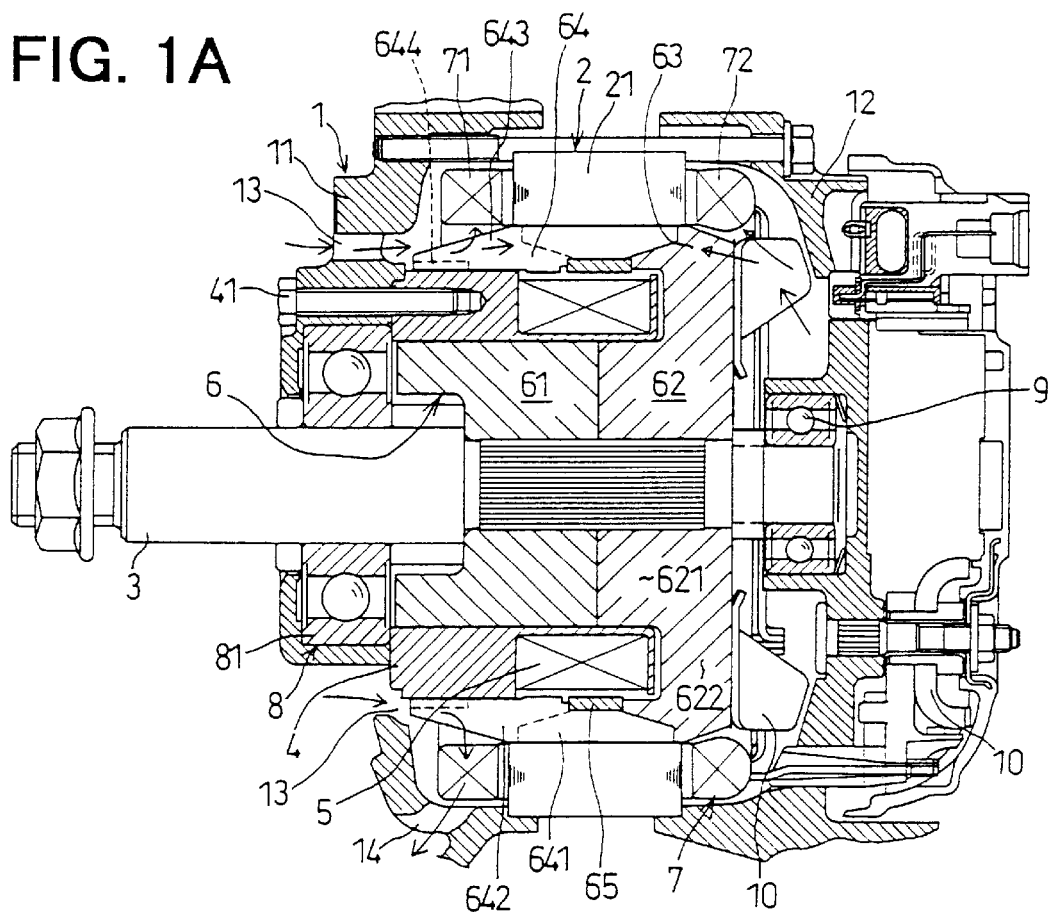
FIG. 1A is an axially cut cross-sectional view of a vehicle AC generator to a preferred embodiment of the invention.
Figure 1B:
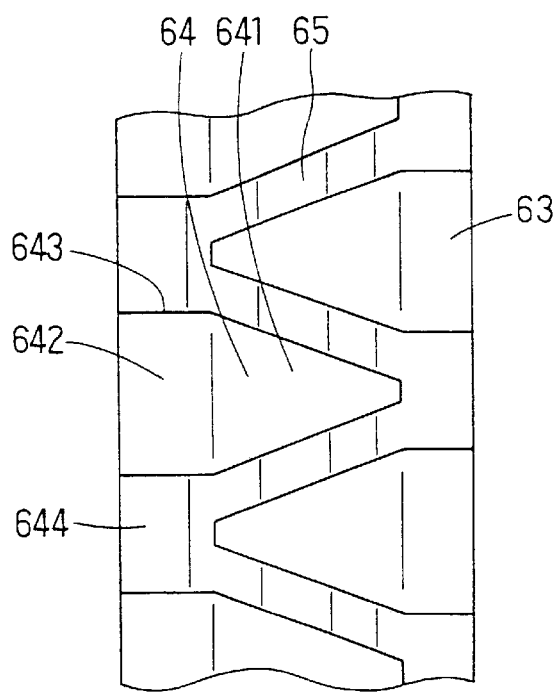
FIG. 1B is a schematic side view illustrating a main portion of magnetic pole mebers of the vehicle AC generator shown in FIG. 1A.

As shown in FIGS. 1A and 1B, the brush-less vehicle AC generator is comprised of a frame 1, a stator 2, a rotor shaft 3, a stationary yoke 4, a field coil 5, a rotary yoke 6, an armature coil 7, a pulley-side bearing 8, a rear-side bearing 9, and a rectifier 10. The stator 2 is comprised of a stator core 21 that is fixed to an inner periphery of the frame 1 and the armature coil 7 wound around the stator core 21. The armature coil 7 has a front coil-end 71 and a rear coil-end 72.

The rotor shaft 3 is supported by front and rear walls 11 and 12 of the frame 1 via bearings 8 and 9. A pulley (not shown) is disposed outside the front wall 11 and is fixed to the left end of the rotor shaft 3.

The stationary yoke 4 is comprised of a soft-iron-made cylindrical member that is fixed to the pulley-side front wall 11 of the frame by a plurality of bolts 41. The field coil 5 is disposed in an annular groove formed in the outside of the rear end of the stationary yoke 4. The rotary yoke 6 is fixed to the rotor shaft 3 and forms a magnetic path for the magnetic field generated by the field coil together with the stationary yoke 4. The rotary yoke 6 is comprised of a pair of front and rear yoke members 61 and 62. The pair of front and rear yoke members 61 and 62 are close to each other and fixed to the rotor shaft 3. A first claw-shaped magnetic pole member (hereinafter referred to as the first pole member) 63 is integrated into the rear yoke member 62, and a second claw-shaped magnetic pole member (hereinafter referred to as the second pole member) 64 is fixed to the first pole member 63 via a ring support 65 made of non-magnetic metal.

The front yoke member 61 is comprised of a cylindrical soft-iron member and is disposed so that the outer periphery thereof faces the inner periphery of the stationary yoke 4 at a small gap.

The rear yoke member 62 is comprised of a cylindrical core portion 621 that is disposed so that the outer periphery thereof faces the inner periphery of the stationary yoke 4 at a small gap and a cylindrical yoke portion 622 disposed at the rear end of the cylindrical core portion 621. The yoke portion 622 has a larger outside diameter than the inside diameter of the stationary yoke 4.

Each pole of the first pole member 63 is made of soft magnetic material and extends from the outer periphery of the yoke portion 622 into a pole space formed between the inner periphery of the stator core 21 and the outer periphery of the field coil 5. The claw poles of the first pole member 63 are disposed along a circumference at equal intervals and axially more inside than the rear coil-end 72. The first pole member 63 has a cooling fan 10 on the rear end thereof.

Each pole of the second pole member 64 is also made of soft magnetic material and faces the outer surface of the stationary yoke 4 at a small gap and extends from the outer periphery of the yoke portion 622 into the pole space to be disposed between the claw poles of the first pole member 63. The claw poles of the second pole member 64 are disposed along a circumference at equal intervals. Each pole of the second pole member 64 is comprised of an effective pole portion 641 disposed inside the stator core 21 and a tapered projection portion 642 axially projecting leftward from the front coil-end 71 of the armature coil 7. The projection portion 642 has upright side walls 643 that are approximately perpendicular to a rotation direction of the second pole members 64 to supply cooling air from air intake window of the frame 1 to air passages in the front coil-end 71 of the armature coil 7. The projection portions 642 also form a portion of the magnetic path. The projection portions 642 face the outer surface of stationary yoke 4 at a small gap and are fixed together and supported by an annular magnetic member 644. The annular magnetic member 644 is spaced apart from the edge of the first pole member 63 to prevent leakage of magnetic flux.

The frame 1 has air intake windows 13 formed at the front wall 11 to face the projection portion 642 and air discharge windows 14 formed at a circumferential portion of the frame 1 around the front coil-end 71. The rear surface of an outer ring 81 of the bearing 8 abuts the front surface of the stationary yoke 4.

Figure 2:
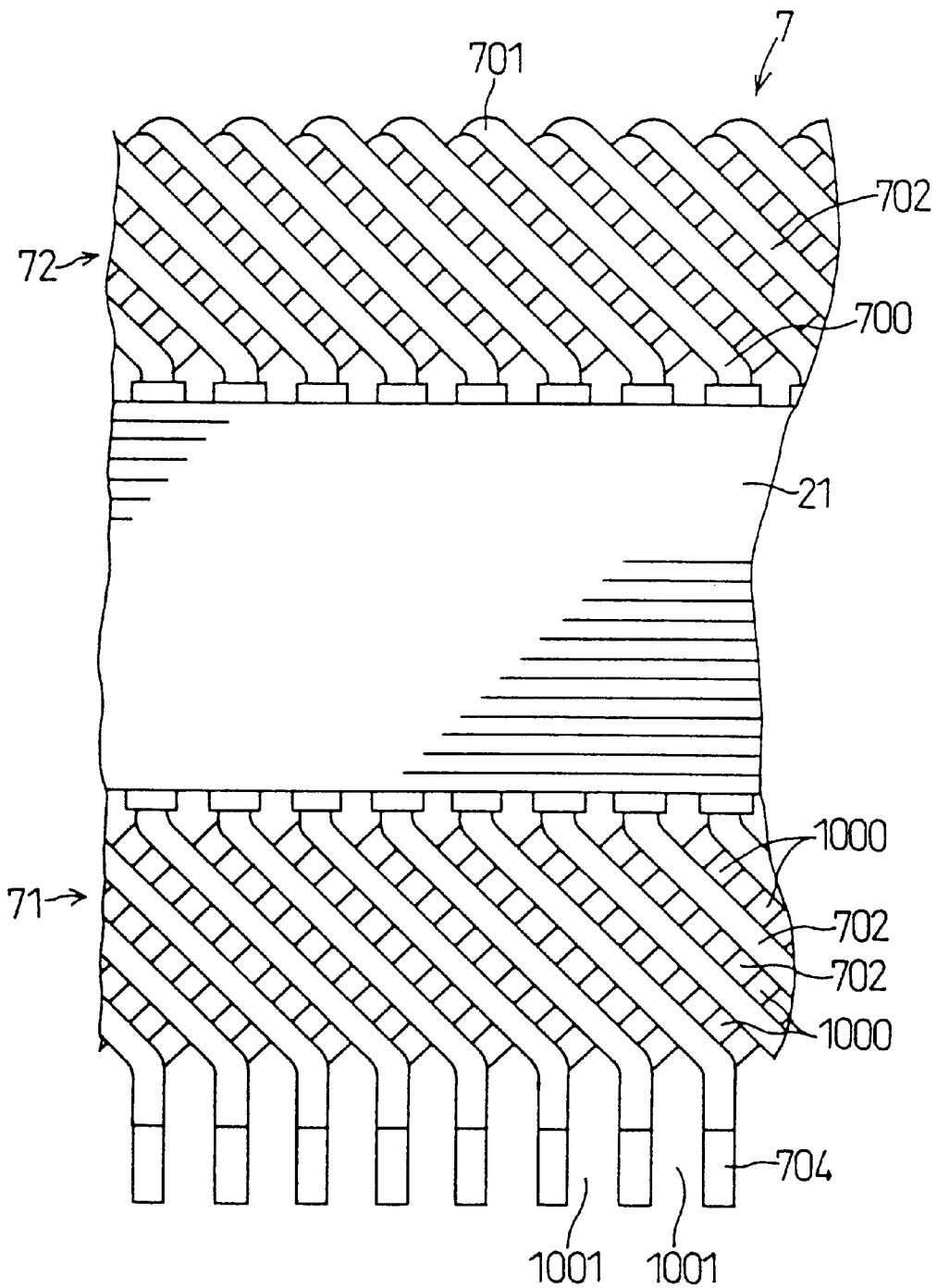
FIG. 2 is a development of an armature coil of the vehicle AC generator shown in FIG. 1.
Figure 3:
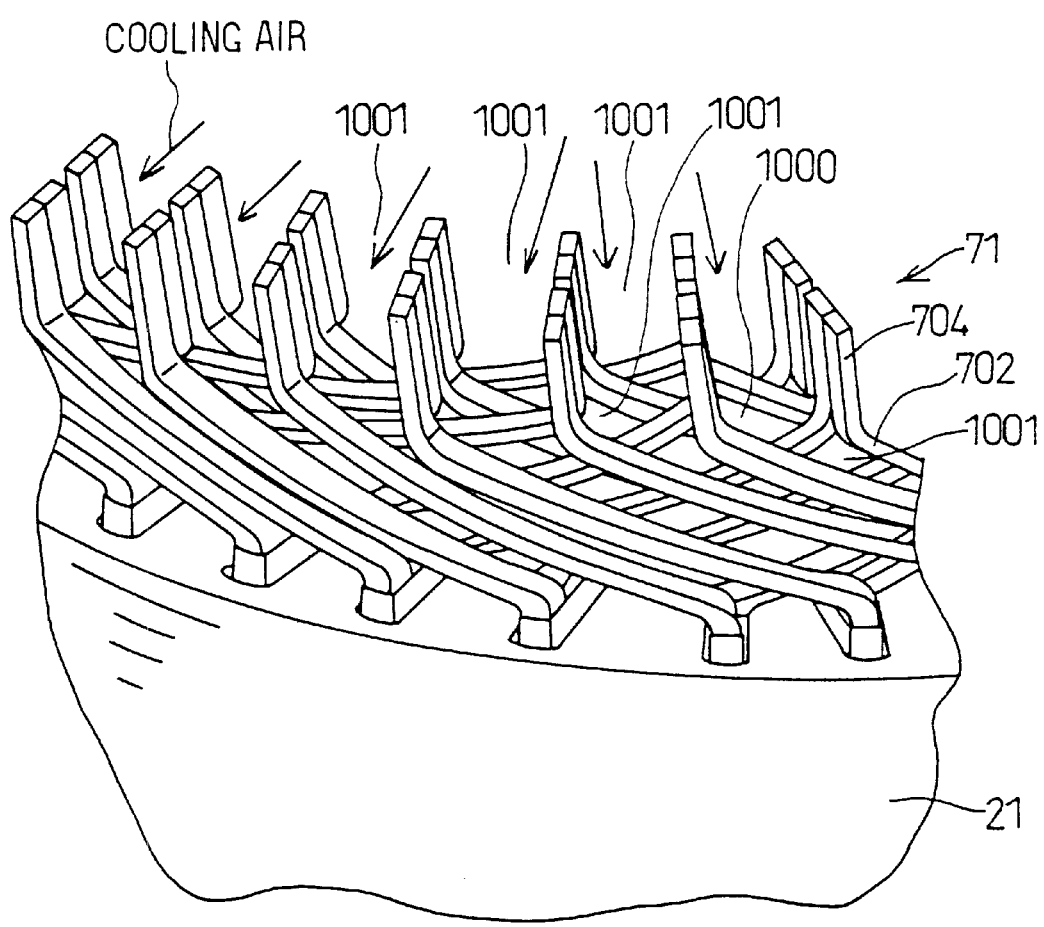
FIG. 3 is a perspective view of a front coil-end of the armature coil of the vehicle AC generator shown in FIG. 1.

As shown in FIGS. 2 and 3, the armature coil 7 is comprised of a plurality of U-shaped conductor segments 702 that has a pair of straight portions 700 and a joint portion that connects the pair of straight portions 700. The straight portions 700 of each U-shaped conductor segment 702 are respectively inserted into a radially different layer of different two slots and are inclined in circumferential directions outside the slots to provide circumferential intervals so that an end 704 of the straight portion 700 is connected to an end of a straight portion of another U-shaped conductor segment.

Manufacturing and assembling of the conductor segment-type rotary electric machine are described in detail in the above-stated patent publication, and therefore omitted here.

As shown in FIGS. 2 and 3, straight portions 700 of the U-shaped conductor segments 702 obliquely extend in parallel with one another in the front coil-end 71 of the armature coil 7. Therefore, a large number of diamond-shape radial cooling passages 1000 are formed at equal intervals in the front coil-end 71. Segment ends 704 of the straight portions 700 of the U-shaped conductor segment 702 extend in the axial direction to be connected to each other. Accordingly, radial air passages having a large axial length are formed among the segment ends 704. The U-shaped conductor segments 702 do not overlap one another either in the circumferential direction or in the axial direction. If air is supplied in the radial direction, the U-shaped conductor segments 702 can be effectively cooled without large flow resistance.

Although FIG. 3 shows four conductors accommodated in each slot, the number of conductors per slot can be increased without substantial change in the radial air passages.

If the rotary yoke 6 rotates, the upright side walls 643 of the projection portion 642 of the second pole member 64 function as magnetic paths as well as a centrifugal fan for blowing air radially outward (or as a mixed flow fan for blowing a portion of air axially rearward). Accordingly, cooling air is taken from the air intake window 13 formed at the front wall 11 opposite the projection portion 642 into the inside of the frame 1. The cooling air is driven by the upright side walls 643 radially outward to blow on the front coil-end 71, passes a large number of the air passages 1000 and 1001 in the front coil-end 71 and discharges from the air discharge windows 14 formed at the circumferential portions of the frame 1.

On the other hand, the rear end of the first pole member 63 is positioned at more front (or left in FIG. 1) than the rear coil-end 72 of the armature coil 7. Therefore, the rear coil-end 72 is effectively cooled by the air that is radially driven by the cooling fan 10, which is fixed to the rear end of the first pole member 63.

The stationary yoke 4 forms the magnetic path together with the rotary yoke 6, and the front surface of the stationary yoke 4 abuts the rear surface of the outer ring 81 of the front bearing 8.

Therefore, the axial shift of the bearing 8 can be restricted, and the outer ring 81 of the bearing 8, which is made of a soft magnetic material, can be utilized as a portion of the magnetic path. As a result, iron loss and field current can be reduced.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A brush-less rotary electric machine, comprising:
   a frame having a first and second walls and a pair of bearings respectively fixed to said first and second walls;
   a stator core having a plurality of slots, said stator core being fixed to said frame;
   an armature coil formed of a plurality conductor segments disposed in said plurality of slots, said conductor segments having a first coil end at an axial end of said stator core and connection ends connected to one another to form a second coil end at the other end of said stator core;
   a rotor shaft rotatably supported by said frame via a pair of bearings fixed to said frame:
   a generally cylindrical stationary yoke;
   a rotary yoke disposed opposite an inner periphery of said stationary yoke and fixed to said rotor shaft;
   a plurality of first claw pole members extending from an end of said rotary yoke to be disposed opposite the inner periphery of said stator core;
   a plurality of second claw pole members each of which is disposed between said first claw pole members opposite the outer periphery of said stationary yoke, said second claw poles being fixed to said first claw pole members by a non-magnetic support member; and
   a field coil fixed to said stationary yoke and wound around said rotary yoke, wherein said armature coil has a plurality of radial air passages at said second coil end, each of said plurality of second claw pole members has an effective pole portion disposed inside said stator core and a projection portion projecting axially outward from said effective pole portion, said projection portion has upright side walls approximately perpendicular to a rotation direction of said second pole member disposed close to said second wall and to said stationary yoke so as to function as a centrifugal fan, and said frame has an air intake window connected to said radial air passages at a radially inner portion facing said projection portion and an air discharge window connected to said radial air passages at a radially outer portion around said projection portion, whereby said side walls supply cooling air from said air intake window to said radial air passages.

2. The brush-less rotary electric machine as claimed in claim 1, wherein
   said connection ends are disposed opposite said plurality of second claw pole members.

3. The brush-less rotary electric machine as claimed in claim 1, wherein
   said projection portion is tapered.

4. The brush-less rotary electric machine as claimed in claim 1, wherein
   said plurality of second claw pole members is supported by an annular magnetic member spaced apart from said plurality of first claw pole members.

5. The brush-less rotary electric machine as claimed in claim 1, wherein
   said stationary yoke is fixed to said second wall.

6. The brush-less rotary electric machine as claimed in claim 1, wherein
   said stationary yoke is disposed to abut said bearing fixed to said second wall.

* * * * *